Patented June 12, 1934

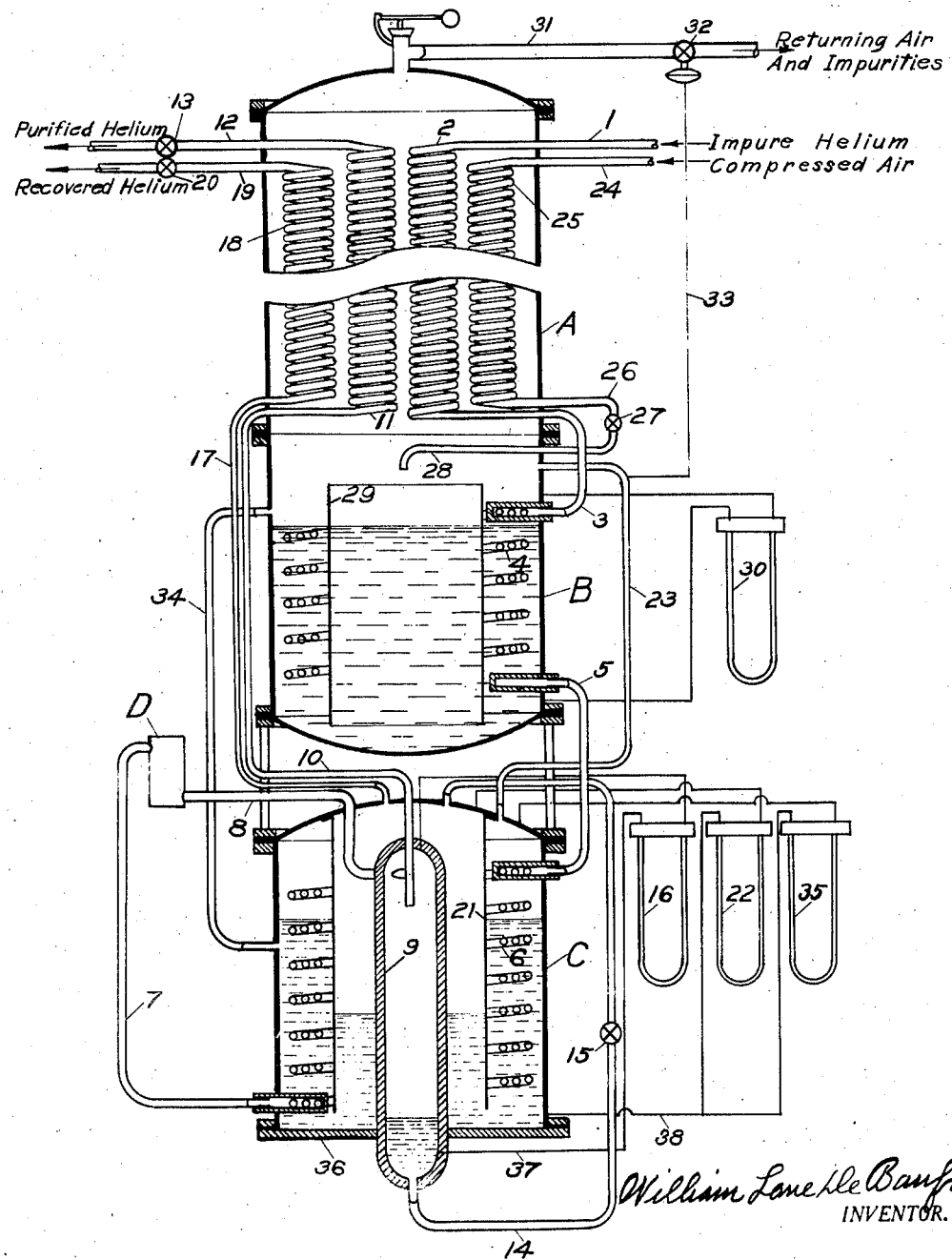

1,962,176

UNITED STATES PATENT OFFICE 1,962,176

APPARATUS FOR SEPARATING MIXED GASES BY SELECTIVE LIQUEFACTION

William Lane De Baufre, Lincoln, Nebr.

Application June 14, 1932, Serial No. 617,106

18 Claims. (Cl. 62—122)

This invention relates to improvements in the art of separating mixed gases and is especially useful in the purification of helium containing nitrogen, oxygen and other gases having much higher boiling points than helium. This patent application covers improvements in the process and apparatus described and claimed in patent applications No. 596,289 filed March 2, 1932, and No. 599,475 filed March 17, 1932. The main object of these improvements is to utilize in a more efficient manner a refrigeration cycle which operates by throttling a cooled gaseous refrigerant from a high pressure rather than by expanding from a moderate pressure through an engine although certain of the improvements are useful in the latter case.

A further object of the improvements is to facilitate the operation of such a purification plant.

The above objects together with such other advantages as may hereinafter appear or are incident to the invention, are accomplished by means of the apparatus which I have illustrated in a preferred form in the accompanying drawing, which is a diagrammatic elevation partly in section of the principal parts of the apparatus.

Referring to the figure, the apparatus comprises an interchanger A, a vaporizer B, a purifier C, a mist collector D and connecting piping and valves, all suspended within a casing (not shown) filled with heat insulating material. The usual gas compressors, purifying towers and cylinders, etc., are required as in other processes for separating mixed gases by liquefaction.

Impure helium containing say 10 per cent of oxygen and nitrogen as impurities is first compressed to say 2000 lb. per sq. in. gage, dried and all traces of carbon dioxide removed. It is then introduced into pipe 1 and flows down through coiled tubes 2 within interchanger A where it is cooled from about atmospheric temperature to a temperature somewhat above that of liquid air at a pressure slightly above atmospheric. The impure helium then flows through pipe 3 to coiled tubes 4 in vaporizer B where it is cooled almost to liquid air temperature. Leaving by pipe 5, the impure helium enters coiled tubes 6 in purifier C where it is further cooled to the final temperature at which most of the impurities are liquefied. Some of the liquefied impurities are in the form of mist, however, in the helium gas as it leaves purifier C through pipe 7.

In passing through mist collector D, containing a number of layers of fine mesh wire screen, this mist is collected into liquid drops. From mist collector D, the impure helium passes through pipe 8 into flask 9, which it enters tangentially near the upper end. The resulting whirling motion throws out the liquid drops and remaining liquid mist to the periphery of the whirling mass of gas where the liquid adheres to the inside surface of the flask and flows down to the bottom of the flask.

The purified helium leaves flask 9 through central pipe 10 and then passes through coiled tubes 11 in interchanger A where it is warmed nearly to atmospheric temperature before leaving through pipe 12. Valve 13 in pipe 12 controls the helium pressure throughout the separation cycle and may be a standard automatic pressure relief valve or may be hand operated.

The liquefied impurities collected in the bottom of flask 9 are withdrawn through pipe 14 containing throttle valve 15 which is operated to withdraw the impurities as rapidly as they accumulate, as indicated by liquid level gage 16. These liquefied impurities contain absorbed helium gas which is largely released when the pressure is reduced from about 2000 lb. per sq. in. within the flask 9 to say 20 lb. per sq. in. absolute in the space surrounding the flask. There will also be some vaporization of the liquefied impurities by reason of the throttling action. Consequently, a mixture of helium gas and saturated vapor of the impurities will accumulate in the space above the liquid surrounding flask 9. This gaseous mixture will leave purifier C through pipe 17 and then pass through coiled tubes 18 in interchanger A where it will be heated nearly to atmospheric temperature before it leaves through pipe 19. Valve 20 enables the gaseous mixture to be removed as fast as formed so as to maintain the proper liquid level in the annular space between flask 9 and skirt 21 as indicated on liquid level gage 22.

The unevaporated liquefied impurities pass down under skirt 21 and up over coiled tubes 6 in the annular space between skirt 21 and the shell of purifier C, the liquid level in this annular space being indicated on liquid level gage 35. The liquefied impurities are evaporated by heat interchange with the impure helium flowing down within coiled tubes 6. The resulting vapor leaves purifier C through pipe 23 and enters vaporizer B above the liquid level therein. The vaporized impurities commingle with air from the refrigeration cycle to be described below and the mixture returns through interchanger A where it is warmed nearly to atmospheric temperature by heat interchange with the fluids flowing within the coiled tubes in the interchanger.

The air of the refrigeration cycle is compressed to say 2000 lb. per sq. in. gage, dried and all traces of carbon dioxide removed. The compressed air then enters pipe 24 and passes down through coiled tubes 25 in interchanger A where the compressed air is cooled to about 150 degrees below zero centigrade before leaving through pipe 26. By means of throttle valve 27, the compressed air is throttled nearly to atmospheric pressure and discharged downward from pipe 28 within vaporizer B. A vertical cylinder 29 with open ends at top and bottom extends above the liquid level in pot B as indicated on liquid level gage 30. Consequently, the portion of the compressed air which has been liquefied by cooling and throttling flows down within cylinder 29, under the lower edge thereof and up over coiled tubes 4. Here the liquid air is in heat interchange with the impure helium flowing down within coiled tubes 4 so that the liquid air is evaporated.

It will be noted that the above described arrangement brings the liquid air in contraflow with the impure helium which drops in temperature as heat is removed therefrom. The liquid air rises in temperature as it is vaporized under nearly constant pressure. Without cylinder 29, coiled tubes 4 would be subject to a bath of liquid air nearly of uniform temperature. Cylinder 29 gives a directed flow to the liquid air so as to take advantage of the lowest temperature reached immediately after throttling when the liquid air contains the maximum percentage of nitrogen. This temperature is lower than the nearly uniform temperature which would exist in the liquid without cylinder 29. Consequently, cylinder 29 enables the helium to be cooled to the lowest possible temperature before leaving vaporizer B.

The air remaining as vapor after throttling, the vaporized air, and the vaporized impurities separated from the impure helium, all commingle and pass upwards over coiled tubes 2, 11, 18 and 25 in interchanger A and are warmed nearly to atmospheric temperature by cooling the fluids flowing down through these tubes. The commingled air and impurities leave through pipe 31 containing the automatic pressure relief valve 32 for maintaining a nearly constant pressure in purifier C and vaporizer B, the control chamber of valve 32 being connected by pipe 33 to pipe 23 connecting vaporizer B and purifier C. This automatic pressure control maintains more nearly uniform operating conditions than if it were attempted to control by a hand operated valve.

Connecting vaporizer B and purifier C is an overflow pipe 34 which enables liquid air to overflow from vaporizer B to purifier C. The advantage of this overflow pipe will become evident in explaining the starting and operation of the unit.

Before describing the starting and operation of the unit, the peculiar advantages of the constructions adopted for connecting the liquid level gages will be discussed. Flask 9 projects through lower head 36 of purifier C in order that tube 37 from liquid level gage 16 can be connected to the side of flask 9 below head 36. Liquid level gage 16 indicates the liquid level within flask 9 by showing a pressure difference corresponding to the head of liquid in flask 9 above the point of connection of tube 37. This can occur only when tube 37 is filled with gas. Any liquid within tube 37 would affect the accuracy of the indication on gage 16. Liquid tends to enter tube 37 from flask 9, but any small amounts that do so by reason of pressure fluctuations, are immediately vaporized because tube 37 is warmer than flask 9 by reason of heat conduction along tube 37. Tube 37 therefore remains filled with gas.

If flask 9 did not project through head 36, it would be necessary either to run tube 37 through the liquefied impurities in purifier C or to connect it to the bottom of flask 9 if the latter touches head 36. Either method of connection is undesirable. The liquefied impurities are at a lower temperature than the liquid within flask 9 and would cause a portion of the gas within tube 37 to be liquefied where the tube passes through the liquefied impurities. The correct liquid level within flask 9 would therefore not be indicated on gage 16. If tube 37 projected downward from the point of connection to flask 9 instead of extending horizontally or preferably at an incline upward, the indications on gage 16 would fluctuate due to liquid flowing into tube 37 and then being ejected therefrom by rapid evaporation of a portion of the liquid.

The arrangement of the two compartments in purifier C by partition 21 extending from the top head nearly to the bottom head 36, makes it possible to connect liquid level gages 22 and 35 by a common tube 38 to the lower part of the shell of purifier C because the liquid levels in the two compartments can be measured from a common point near the lower end of partition 21.

After the unit has been thoroughly dried out by passing heated air through it, the unit is cooled by means of the refrigeration cycle. When compressed air is first passed down through coiled tubes 25, a small cooling effect occurs at throttle valve 27. The returning cooled air then cools the down flowing compressed air so that its temperature is reduced before reaching valve 27. The cooling effect is thus cumulative, so that liquid air temperature is soon reached and a portion of the compressed air liquefies after throttling and collects in vaporizer B.

The liquid level rises as indicated on liquid level gage 30 until the liquid air overflows through pipe 34 into purifier C. After purifier C reaches liquid air temperature, liquid air also accumulates therein as indicated on liquid level gages 22 and 35.

More rapid cooling of the plant can be accomplished by passing air through the helium cycle as well as through the refrigeration cycle if the piping to the various compressors is arranged for so doing.

As soon as liquids have accumulated to normal operating levels in purifier C, impure helium can be passed through the plant and purified immediately.

During normal operation, the pressure within the helium cycle will be maintained nearly constant by means of valve 13, either hand or automatically controlled. The liquefied impurities collected in flask 9 will be withdrawn through valve 15 to maintain the liquid level therein as indicated on liquid level gage 16. The recovered helium will be withdrawn through valve 20 to maintain a nearly constant level as indicated on liquid level gage 22. If the refrigeration supplied by the refrigeration cycle just balances the heat leak into the plant and other heat gains, the liquid level in the outer compartment of purifier C and the liquid level within vaporizer B will remain constant as indicated on liquid level gages 35 and 30 respectively.

Should the last mentioned liquid levels fall, it is an indication of insufficient refrigeration. By slightly closing throttle valve 27, the compressed air pressure will rise and the increased throttling effect will produce increased refrigeration. Should the liquid levels in vaporizer B and purifier C rise, this would indicate an excess of refrigeration, so that throttle valve 27 should be opened slightly to reduce the throttling effect.

The cooling in coiled tubes 4 and 6 in vaporizer B and purifier C respectively, supplement each other. That is, the greater the cooling in vaporizer B, the less will be the heat remaining in the impure helium to vaporize the liquid impurities in purifier C. If these impurities accumulate in purifier C with a rise in liquid level as shown on liquid level gage 35, the liquid level in vaporizer B should be permitted to drop by changing the throttling effect at valve 27 until equilibrium is reached. Should, however, the liquid level in purifier C drop, then the liquid level in B should be caused to rise by changing the throttling effect at valve 27. By causing the liquid level in B to rise to the overflow pipe 34, a great deficiency in liquid in purifier can be remedied during operation.

The impure helium is shown in the drawing as first passing through coiled tubes 4 immersed in the liquid air bath in vaporizer B and then through coiled tubes 6 immersed in the liquefied impurities in purifier C. This order of cooling is ordinarily preferable because the liquefied impurities will usually have a lower temperature than the liquid air for the reasons explained in the patent applications previously mentioned. Conditions may exist, however, under which it would be preferable to pass the impure helium through coiled tubes 6 in purifier C before passing it through coiled tubes 4 in vaporizer B. This would be the case, for example, where the impurities in the helium are hydrocarbons instead of atmospheric air. In such case, it is proposed to employ nitrogen (free of oxygen) instead of atmospheric air as the refrigerant. The liquid bath in vaporizer B would then be nitrogen at a lower temperature than the oxygen-nitrogen mixture obtained by partly liquefying air. The liquid bath in purifier C would consist of hydrocarbons at a considerably higher temperature than the more usual mixtures of oxygen and nitrogen. The temperature of the liquid nitrogen in vaporizer B would be lower than the temperature of the liquid hydrocarbons in purifier C. This might even be true with considerable nitrogen mixed in the liquid hydrocarbons in spite of the partial pressure of the helium above the liquefied impurities.

In case helium is used in an airship where it becomes contaminated with hydrocarbons as well as oxygen and nitrogen, it is proposed to burn out the free oxygen by some catalytic or electrical discharge effect and then utilize a refrigerant which is oxygen free, such as nitrogen or natural gas, so that there will be no danger of producing an explosive mixture within the helium purification apparatus. In this case, the impure helium will be passed first through coiled tubes 6 in purifier C and finally through coiled tubes 4 in vaporizer B.

I claim:

1. An apparatus for separating impurities by selective liquefaction from a gas having a much lower boiling point than that of any of the said impurities and utilizing a refrigerant, including an interchanger wherein the said gas and said refrigerant are cooled by commingled refrigerant and impurities separated from said gas, a vaporizer wherein the said gas is further cooled by liquefied refrigerant, a purifier wherein the said gas is still further cooled by liquefied impurities separated from said gas, means for separating the liquefied impurities from the said gas and for introducing them into the purifier, means for introducing liquefied refrigerant into the vaporizer, and means for commingling vaporized impurities from the purifier and vaporized refrigerant from the vaporizer and for returning the commingled refrigerant and impurities to the interchanger.

2. An apparatus for separating impurities by selective liquefaction from a gas having a much lower boiling point than that of any of the said impurities and utilizing a refrigerant, including a vertical interchanger wherein the said gas and said refrigerant are cooled by commingled refrigerant and impurities separated from said gas, a vaporizer attached to the lower end of the interchanger and wherein the said gas is further cooled by liquefied refrigerant, a purifier wherein the said gas is still further cooled by liquefied impurities separated from said gas, means for separating the impurities from the said gas and for introducing them into the purifier, means for introducing liquefied refrigerant into the vaporizer, and means for commingling vaporized impurities from the purifier and vaporized refrigerant from the vaporizer and for returning the commingled refrigerant and impurities to the interchanger.

3. An apparatus for separating impurities by selective liquefaction from a gas having a much lower boiling point than that of any of the said impurities and utilizing a refrigerant, including a vertical interchanger wherein the said gas and said refrigerant are cooled by commingled refrigerant and impurities separated from said gas, a vaporizer attached to the lower end of the interchanger and wherein the said gas is further cooled by liquefied refrigerant, a purifier suspended from the vaporizer and wherein the said gas is still further cooled by liquefied impurities separated from said gas, means for separating the impurities from the said gas and for introducing them into the purifier, means for introducing liquefied refrigerant into the vaporizer, and means for commingling vaporized impurities from the purifier and vaporized refrigerant from the vaporizer and for returning the commingled refrigerant and impurities to the interchanger.

4. In an apparatus for separating impurities by selective liquefaction from a gas having a much lower boiling point than that of any of the said impurities and utilizing a refrigerant, an interchanger for cooling said gas and said refrigerant by commingled refrigerant and impurities separated from said gas, and a vaporizer for further cooling said gas by liquid refrigerant, the said vaporizer comprising a shell, a partition within said shell dividing the vaporizer into two compartments, means for introducing the liquid refrigerant into one of said compartments, and a coil so suspended in the other of said compartments that the liquid refrigerant flows under said partition and up over said coil in contraflow to the gas flowing down through said coil.

5. An apparatus for separating impurities by selective liquefaction from a gas having a much lower boiling point than that of any of the said impurities and utilizing a refrigerant, including an interchanger wherein the said gas and said refrigerant are cooled by commingled refrigerant and impurities separated from said gas, a vaporizer wherein the said gas is further cooled by liquefied refrigerant in contraflow heat interchange relation with said gas, means for introducing liquefied refrigerant into the vaporizer, means for separating the impurities from said gas, and means for commingling the impurities and vaporized refrigerant from the vaporizer and for returning commingled refrigerant and impurities to the interchanger.

6. An apparatus for separating impurities by selective liquefaction from a gas having a much lower boiling point than that of any of the said impurities and utilizing a refrigerant, including an interchanger wherein the said gas and the said refrigerant are cooled by commingled refrigerant and impurities separated from said gas, a vaporizer wherein the said gas is further cooled by liquefied refrigerant, a purifier wherein the said gas is still further cooled by contraflow heat interchange with liquefied impurities separated from said gas, means for separating the liquefied impurities from said gas and for introducing them into the purifier, means for introducing liquefied refrigerant into the vaporizer, and means for commingling vaporized impurities from the purifier and vaporized refrigerant from the vaporizer and for returning the commingled refrigerant and impurities to the interchanger.

7. An apparatus for separating impurities by selective liquefaction from a gas having a much lower boiling point than that of any of the said impurities and utilizing a refrigerant, including an interchanger wherein the said gas and the said refrigerant are cooled by commingled refrigerant and impurities separated from said gas, a vaporizer wherein the said gas is further cooled by liquefied refrigerant, a purifier wherein the said gas is still further cooled by liquefied impurities separated from said gas, means for separating the liquefied impurities from the said gas and for introducing them into the purifier, means for introducing liquefied refrigerant into the vaporizer, means for the liquefied refrigerant in the vaporizer to overflow into the purifier, and means for commingling vaporized refrigerant from the vaporizer and vaporized refrigerant and impurities from the purifier and for returning the commingled refrigerant and impurities to the interchanger.

8. In an apparatus for separating impurities by selective liquefaction from a gas having a much lower boiling point than that of any of the said impurities and utilizing a refrigerant, an interchanger for cooling said gas and said refrigerant by commingled refrigerant and impurities separated from said gas, a vaporizer for further cooling said gas by liquid refrigerant, and a purifier for still further cooling said gas by liquefied impurities separated from said gas, means for the liquid refrigerant in the vaporizer to overflow into the purifier and means for the vaporized impurities to return from the purifier to the vaporizer above the highest liquid level therein.

9. A combined interchanger and vaporizer wherein a compressed gaseous refrigerant and another fluid are cooled in the interchanger, including means for throttling the compressed gaseous refrigerant to a lower pressure, means for discharging it into the vaporizer, means for separating the portion liquefied by cooling and throttling from the portion remaining in the gaseous state, and means for utilizing the liquefied portion to cool further the other fluid previously cooled in the interchanger.

10. A combined interchanger and vaporizer comprising a vertical cylindrical shell, tubes within said shell for conveying compressed gaseous refrigerant downwards through the interchanger portion, tubes within said shell for conveying a fluid to be cooled downwards through the interchanger portion, tubes within said shell for conveying a fluid to be warmed upwards through the interchanger portion, tubes within the lower vaporizer portion of said shell for further cooling the fluid to be cooled, and means for throttling the compressed gaseous refrigerant to a lower pressure and discharging it within the lower vaporizer portion of said shell.

11. In an apparatus for separating impurities by selective liquefaction from a gas having a much lower boiling point than that of any of the said impurities and utilizing a refrigerant, an interchanger for cooling the impure gas and the compressed refrigerant and for warming the purified gas and a portion of the impurities containing some of the said gas to be recovered, by heat interchange with commingled returning refrigerant and the remaining impurities separated from said gas, a vaporizer for further cooling the impure gas by heat interchange with liquefied refrigerant, means for throttling the cooled compressed gaseous refrigerant into the vaporizer, a purifier for still further cooling the impure gas until a large portion of the impurities are liquefied by heat interchange with these liquefied impurites separated from the said gas within the purifier, and means for conveying the said gas, impurities separated therefrom and refrigerant between the interchanger, vaporizer and purifier.

12. An apparatus for separating impurities by selective liquefaction from a gas having a much lower boiling point than that of any of the said impurities and utilizing a refrigerant, including means of cooling the impure gas by heat interchange with a liquid bath consisting of liquefied refrigerant and means of cooling the impure gas by heat interchange with a liquid bath consisting of liquefied impurities separated from said gas.

13. An apparatus for separating impurities by selective liquefaction from a gas having a much lower boiling point than that of any of the said impurities and utilizing a refrigerant, including means for producing a liquid bath of liquefied impurities, means for producing a liquid bath of liquefied refrigerant, and means for passing the impure gas first through the liquid bath of higher temperature and then through the liquid bath of lower temperature in heat interchange relation with said liquid baths.

14. In an apparatus for separating impurities by selective liquefaction from a gas having a much lower boiling point than that of any of the said impurities, a purifier comprising a shell, a lower head, a central flask projecting through the lower head and supported thereby, an upper head, and a partition projecting downwards from the upper head and dividing the space between the shell and the flask into two annular compartments communicating at their lower portions.

15. In an apparatus for separating impurities by selective liquefaction from a gas having a much lower boiling point than that of any of the said impurities, a purifier comprising a shell, a lower head, a central flask projecting through the lower head and supported thereby, an upper head, a partition projecting downwards from the upper head and dividing the space between the shell and the flask into two annular compartments communicating at their lower portions, and a liquid level gage connected to the upper portion of said flask and to the lower portion of said flask below the said lower head to indicate the liquid level within said flask.

16. In an apparatus for separating impurities by selective liquefaction from a gas having a much lower boiling point than that of any of the said impurities, a purifier comprising a shell, a lower head, a central flask projecting through the lower head and supported thereby, an upper head, a partition projecting downwards from the upper head and dividing the space between the shell and the flask into two annular compartments communicating below the said partition, and two liquid level gages connected to the lower portion of said purifier and to the upper portions of the respective annular compartments to indicate the respective liquid levels within said compartments.

17. An apparatus for separating impurities by selective liquefaction from a gas having a much lower boiling point than that of any of the said impurities and utilizing a refrigerant, including an interchanger wherein the said gas and said refrigerant are cooled by commingled refrigerant and impurities separated from said gas, a vaporizer attached to the lower end of said interchanger and wherein the said gas is further cooled by liquefied refrigerant, a purifier suspended from said vaporizer and wherein the said gas is still further cooled by liquefied impurities separated from said gas, means for separating the impurities from the said gas and for introducing them into the purifier, means for introducing the liquefied refrigerant into the vaporizer, and means for commingling vaporized impurities from the purifier and vaporized refrigerant from the vaporizer and for returning the commingled refrigerant and impurities to the interchanger, the purifier and the vaporizer and the interchanger being all of nearly the same diameter so as to be supported as a unit by being suspended at the upper end of the interchanger.

18. An apparatus for the purification of helium by selective liquefaction wherein the refrigeration necessary to balance heat leak into the apparatus and other heat gains is supplied by means of a highly compressed imperfect gas, including means for cooling the impure helium and the highly compressed imperfect gas by heat interchange with commingled refrigerant and impurities separated from the helium, means for separating the impurities from the helium, means for throttling the highly compressed imperfect gas after being cooled, and means for commingling the refrigerant and the separated impurities.

WILLIAM LANE DE BAUFRE.